US008675128B2

(12) United States Patent
Pearlstein et al.

(10) Patent No.: US 8,675,128 B2
(45) Date of Patent: *Mar. 18, 2014

(54) IMAGE PROCESSING METHOD AND SYSTEM WITH REPETITIVE PATTERN DETECTION

(75) Inventors: Larry Pearlstein, Newtown, PA (US); Min Wang, Scarborough (CA); Marinko Karanovic, Markham (CA)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,709

(22) Filed: Jul. 26, 2012

(65) Prior Publication Data

US 2012/0287339 A1    Nov. 15, 2012

Related U.S. Application Data

(63) Continuation of application No. 12/511,697, filed on Jul. 29, 2009, now Pat. No. 8,253,854.

(60) Provisional application No. 61/129,916, filed on Jul. 29, 2008.

(51) Int. Cl.
*H04N 7/01*    (2006.01)

(52) U.S. Cl.
USPC ........... 348/441; 348/459; 348/558; 348/458; 348/452; 382/300

(58) Field of Classification Search
USPC .......... 348/441, 459, 558, 458, 452; 382/300; 375/240.01, 240.16
See application file for complete search history.

(56) References Cited

U.S. PATENT DOCUMENTS

| | | | |
|---|---|---|---|
| 8,253,854 B2 * | 8/2012 | Pearlstein et al. ............ 348/441 |
| 2009/0273710 A1 | 11/2009 | Pearlstein et al. |
| 2010/0026888 A1 | 2/2010 | Pearlstein et al. |

* cited by examiner

*Primary Examiner* — Jefferey Harold
*Assistant Examiner* — Jean W Desir
(74) *Attorney, Agent, or Firm* — Thomas | Horstemeyer, LLP (57) ABSTRACT

An image processing engine, comprising: a frame rate conversion entity configured to: (a) generate output pictures from input pictures, the output pictures comprising a set of first output pictures and a plurality of sets of second output pictures, each set of second output pictures being associated with one of the first output pictures, each of the first output pictures being derived from a respective one of the input pictures; and (b) control generation of the set of second output pictures associated with a particular first output picture based upon repetitive pattern presence detection within a related picture that is either (i) the particular first output picture or (ii) the input picture from which the particular first output picture was derived.

20 Claims, 5 Drawing Sheets

IMAGE PROCESSING METHOD AND SYSTEM WITH REPETITIVE PATTERN DETECTION

CROSS-REFERENCE TO RELATED APPLICATIONS/INCORPORATION BY REFERENCE

This patent application is a continuation of copending U.S. Utility patent application having Ser. No. 12/511,697, filed Jul. 29, 2009, which claims benefit from U.S. Provisional Patent Application Ser. No. 61/129,916, filed on Jul. 29, 2008.

The above stated applications are hereby incorporated herein by reference in its entirety.

FIELD OF THE INVENTION

Certain embodiments of the invention relate to video image processing. More specifically, certain embodiments of the invention relate to an image processing method and system with repetitive pattern detection.

BACKGROUND OF THE INVENTION

Video images are captured at a frame rate that is sufficiently high to trick the human brain into perceiving continuous motion when in fact a discrete number of images per second is being presented. In many video processing applications, frame rate conversion is required to ensure that the type of equipment used to process and display images is not constrained by the frame rate used to capture those images.

Because the frame rate conversion process generates output images at time instants not exactly corresponding to those of the input images, a process called motion estimation is required between successive input images. In particular, the motion estimation process outputs a motion vector indicative of a magnitude and direction of apparent motion of one or more pixels from one input image to another. This motion vector is then used in properly situating these one or more pixels in intermediate images by using techniques such as linear interpolation.

In some cases, however, errors in the motion estimation process can occur. For example, when an image exhibiting a horizontal, vertical, diagonal or tilted two-dimensional pattern is subjected to a conventional motion estimation process, the resulting motion vector may be inaccurate. In such instances, an intermediate image generated by interpolation relying on an inaccurate motion vector can result in a degradation of the perceived image quality.

Against this background, there is a need in the industry to provide a motion estimation process that is more robust to the presence of repetitive patterns.

BRIEF SUMMARY OF THE INVENTION

According to a first aspect, the present invention seeks to provide an image processing engine, comprising: a frame rate conversion entity configured to: (a) generate output pictures from input pictures, the output pictures comprising a set of first output pictures and a plurality of sets of second output pictures, each set of second output pictures being associated with one of the first output pictures, each of the first output pictures being derived from a respective one of the input pictures; and (b) control generation of the set of second output pictures associated with a particular first output picture based upon repetitive pattern presence detection within a related picture that is either (i) the particular first output picture or (ii) the input picture from which the particular first output picture was derived.

According to a second aspect, the present invention seeks to provide a method, comprising: generating a set of first output pictures and a plurality of sets of second output pictures, each set of second pictures being associated with one of the first output pictures, each of the first output pictures being derived from a respective input picture in a stream of input pictures; and controlling generation of the set of second output pictures associated with a particular first output picture based on repetitive pattern presence detection within a related picture that is either (i) the particular first output picture or (ii) the input picture from which the particular first output picture was derived.

According to a third aspect, the present invention seeks to provide a computer-readable storage medium comprising computer-readable instructions for instructing a computing device to: (a) generate a set of first output pictures and a plurality of sets of second output pictures, each set of second pictures being associated with one of the first output pictures, each of the first output pictures being derived from a respective input picture in a stream of input pictures; and (b) control generation of the set of second output pictures associated with a particular first output picture based on repetitive pattern presence detection within a related picture that is either (i) the particular first output picture or (ii) the input picture from which the particular first output picture was derived.

According to a fourth aspect, the present invention seeks to provide a computer-readable storage medium storing instructions which, when processed, are used to generate an entity configured to: (a) generate a set of first output pictures and a plurality of sets of second output pictures, each set of second pictures being associated with one of the first output pictures, each of the first output pictures being derived from a respective input picture in a stream of input pictures; and (b) control generation of the set of second output pictures associated with a particular first output picture based on repetitive pattern presence detection within a related picture that is either (i) the particular first output picture or (ii) the input picture from which the particular first output picture was derived.

These and other aspects and features of the present invention will now become apparent to those of ordinary skill in the art upon review of the following description of specific embodiments of the invention in conjunction with the accompanying drawings.

It is to be understood that the description and drawings are only for the purpose of illustration of certain embodiments of the invention and are an aid for understanding. They are not intended to be a definition of the limits of the invention.

DETAILED DESCRIPTION OF THE INVENTION

Figure 1:
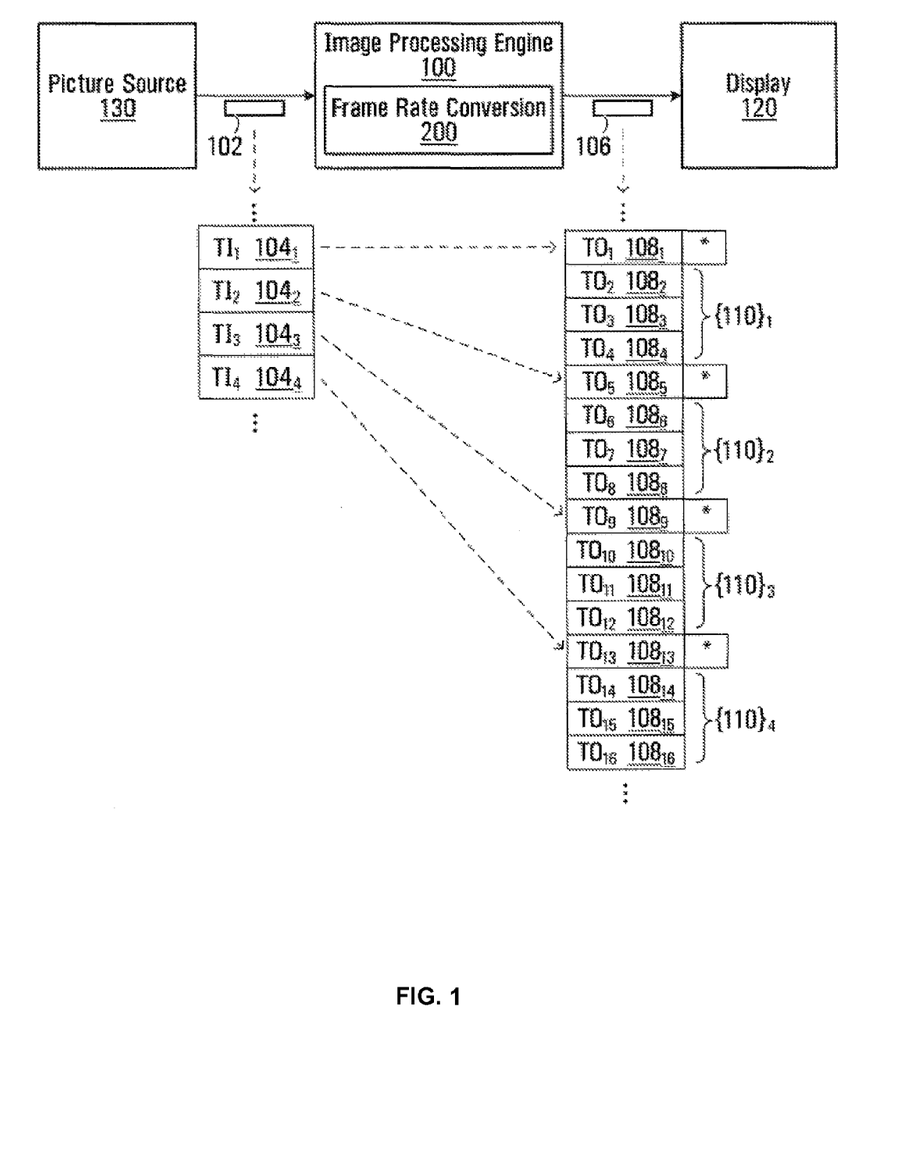
FIG. 1 is a block diagram of an image processing engine that performs a frame rate conversion process on an input picture stream to produce an output picture stream.

Reference is made to FIG. 1, which shows an image processing engine 100 adapted to receive an input picture stream 102 from a picture source 130 such as a picture buffer. The input picture stream 102 comprises a sequence of input pictures $104_{1,2,3...}$ at an input frame rate $FR_{in}$ that can be expressed in pictures per time unit (e.g., pictures per second, hereinafter abbreviated as "pps"). Each of the input pictures $104_{1,2,3...}$ is associated with an input time instant $TI_{1,2,3,...}$. Thus, for example, where the input frame rate $FR_{in}$ is 24 pps, the time instants $TI_{1,2,3,...}$ occupied by the input pictures $104_{1,2,3...}$ will be separated by ¼4 s.

The image processing engine 100 produces an output picture stream 106 from the input picture stream 102. To this end, the image processing engine 100 implements a frame rate conversion entity 200 that executes a frame rate conversion process. The output picture stream 106 comprises a sequence of output pictures $108_{1,2,3...}$ at an output frame rate $FR_{out}$ that can be expressed in pictures per time unit (e.g., pps). The output picture stream 106 can be rendered on a display 120. Each of the output pictures $108_{1,2,3...}$ is associated with an output time instant $TO_{1,2,3,...}$. Thus, for example, where the output frame rate $FR_{out}$ is 60 pps, the time instants $TO_{1,2,3,...}$ occupied by the output pictures $108_{1,2,3...}$ will be separated by ⅟60 s.

One function of the frame rate conversion process is to generate each output picture $108_j$ such that it contains appropriate visual effects (or lacks unsuitable visual artifacts) relative to its temporal neighbors (namely, output pictures $108_{j-1}$ and $108_{j+1}$), particularly as regards the appearance of motion. The frame rate conversion process executed by the frame rate conversion entity 200 can be viewed as a sequence of steps, some of which will be described later with additional reference to FIGS. 2A and 2B.

It will be appreciated that among the output pictures $108_{1,2,3...}$, some correspond to respective ones of the input pictures $104_{1,2,3...}$. Such output pictures are hereinafter referred to as "original" output pictures and denoted by an asterisk (*). Each original output picture $108^*_j$ is derived from a corresponding input picture $104_m$. In some cases, original output picture $108^*_j$ is a copy of the corresponding input picture $104_m$. In other cases, processing functions not related to frame rate conversion may be performed in order to generate original output picture $108^*j$ from input picture $104_m$.

It will also be appreciated that among the output pictures $108_{1,2,3...}$, those that are not original output pictures are "interpolated" pictures. In one embodiment, an interpolated picture is derived from a combination of two or more of the input pictures $104_{1,2,3...}$. In another embodiment, an interpolated picture is derived from one of the input pictures $104_{1,2,3,...}$ and a set of previously calculated motion vectors. In accordance with an embodiment of the present invention, the image processing engine 100 computes a set of "R" interpolated pictures $\{110\}_j$ for original output picture $108^*_j$. Specifically, the set of R interpolated pictures $\{110\}_j$ for original output picture $108^*_j$ may be computed from a combination of (i) input picture $104_m$ or original picture $108^*_j$ and (ii) one or more other ones of the input pictures $104_{1,2,3...}$ using any one of a number of interpolation techniques.

In one specific non-limiting example embodiment, the interpolation technique used to generate the set of R interpolated pictures $\{110\}_j$ for original output picture $108^*_j$ includes a step of motion estimation. In particular, and with reference to FIG. 2A, a set of candidate motion vectors $\{V\}_{1,2,3,...}$ is obtained for each of a number of pixel collections $B_{1,2,3,...}$ in original output picture $108^*_j$. It should be appreciated that because original output picture $108^*_j$ corresponds to input picture $104_m$, the set of candidate motion vectors $\{V\}_{1,2,3,...}$ could equivalently be obtained for the same pixel collections $B_{1,2,3,...}$ in the corresponding input picture $104_m$. While the following description will consider the situation strictly from the vantage point of original output picture $108^*_j$, this has been done for convenience and ease of understanding, and is not to be considered a limitation of the scope of the invention.

Figure 2A:
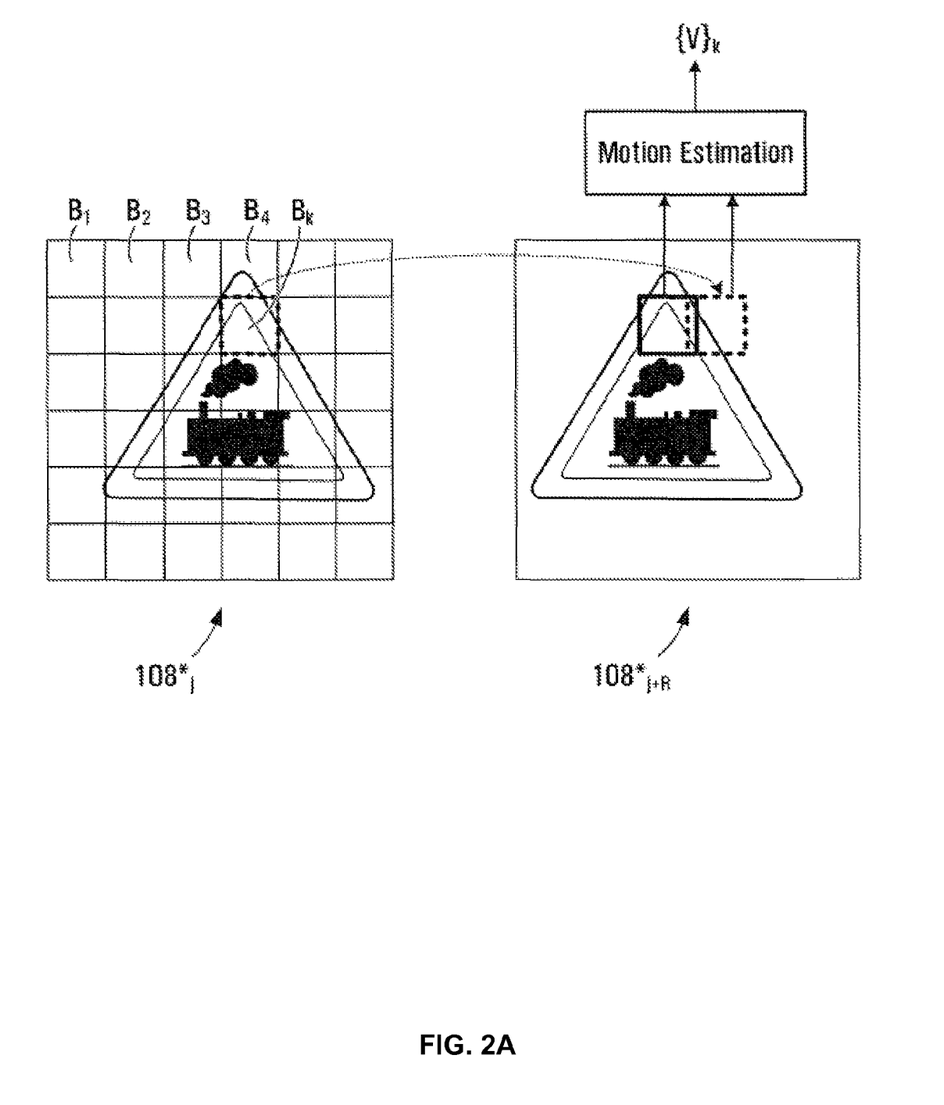
FIG. 2A illustrates the process of obtaining candidate motion vectors for a number of pixel collections in a particular output picture.

Each of the pixel collections $B_{1,2,3,...}$ in original output picture $108^*_j$ may include one or more pixels arranged in any shape such as, but not limited to, a block. An example of a suitable block size is 128×64 pixels, which is in no way limiting. Each set of candidate motion vectors $\{V\}_k$ represents the magnitude and direction of apparent motion of the corresponding pixel collection Bk between original output picture $108^*_j$ and another original output picture (in this case, original output picture $108^*_{j+R}$).

Next, one of the candidate motion vectors in each set $\{V\}_{1,2,3,...}$ is selected as the "true" motion vector for the corresponding pixel collection $B_{1,2,3,...}$, respectively, and is denoted $V^*_{1,2,3,...}$, respectively. This can be done based on various criteria. In one embodiment, a candidate motion vector belonging to an identified cluster of candidate motion vectors within a particular set $\{V\}_k$ could be selected as the true motion vector $V^*_k$ for pixel collection $B_k$.

Figure 2B:
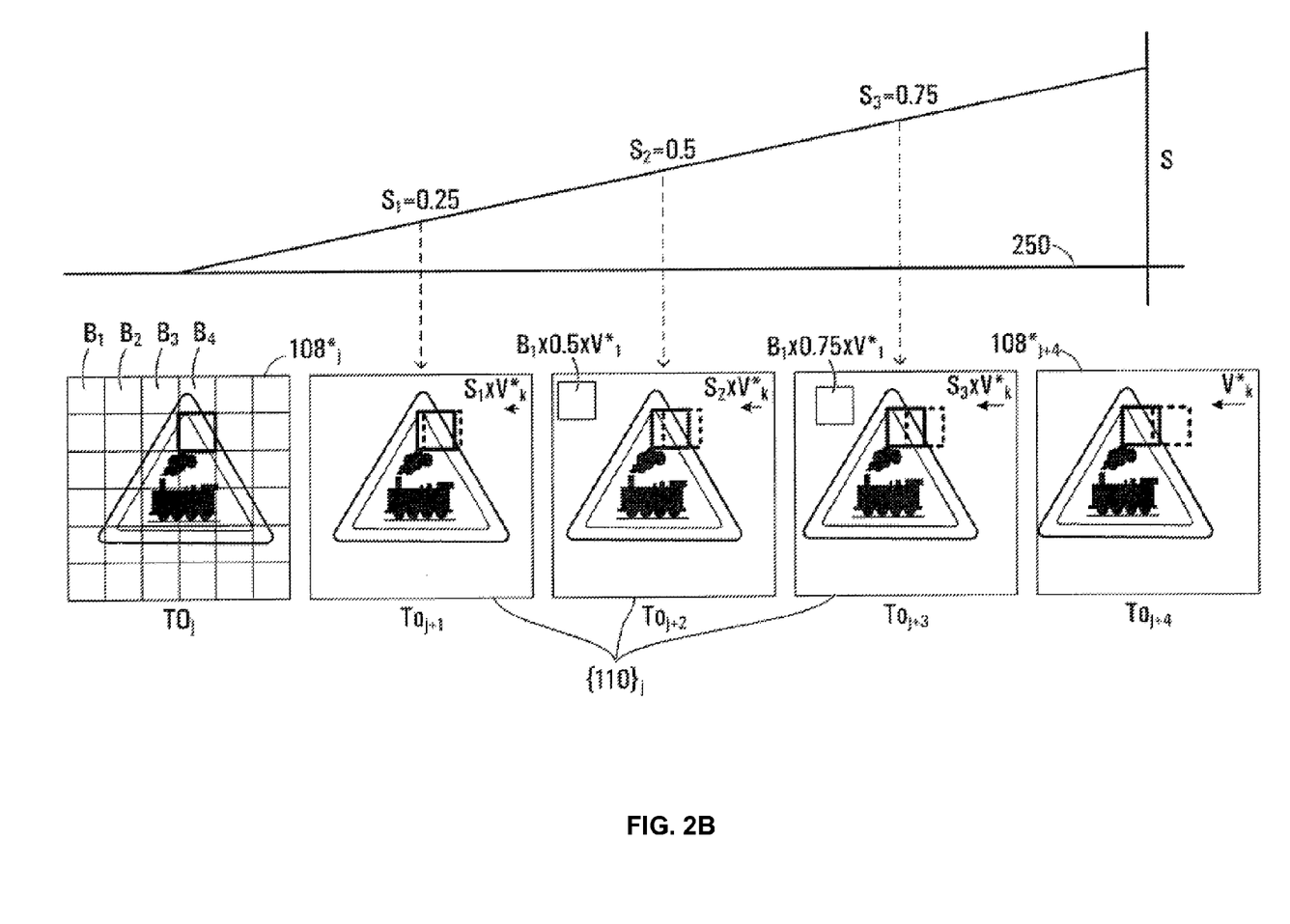
FIG. 2B illustrates the generation of interpolated pictures between the particular output picture and another output picture based on scaling of true motion vectors obtained from the candidate motion vectors.

Reference is now made to FIG. 2B. Having obtained the true motion vectors $V^*_{1,2,3,...}$ for the various pixel collections $B1,2,3,...$ in original output picture $108^*j$, the R interpolated pictures $\{110\}_j$ for original output picture $108^*_j$ are generated as follows in the specific non-limiting case of linear interpolation. Considering the $r^{th}$ interpolated picture in the set $\{110\}_j$, each pixel collection $B_k$ in original output picture $108^*_j$ is translated by its corresponding true motion vector $V^*_k$, scaled by a factor S. The factor S corresponds to the relative temporal position of the aforementioned $r^{th}$ interpolated picture along a time line 250 that connects original output picture $108^*_j$ to the other original output picture(s) (in this case, original output picture $108^*_{j+R}$) from which the true motion vector $V^*_k$ for pixel collection $B_k$ was obtained.

In accordance with an embodiment of the present invention, selection of the true motion vectors $V^*_{1,2,3,...}$ for the various pixel collections $B_{1,2,3,...}$ is influenced by the presence of repetitive patterns in original output picture $108^*_j$. Specifically, the image processing engine 100 may effect an additional step of carrying out repetitive pattern presence detection within original output picture $108^*_j$. In one embodiment, this yields a set of periodicity vectors for original output picture $108^*_j$.

Figure 3:
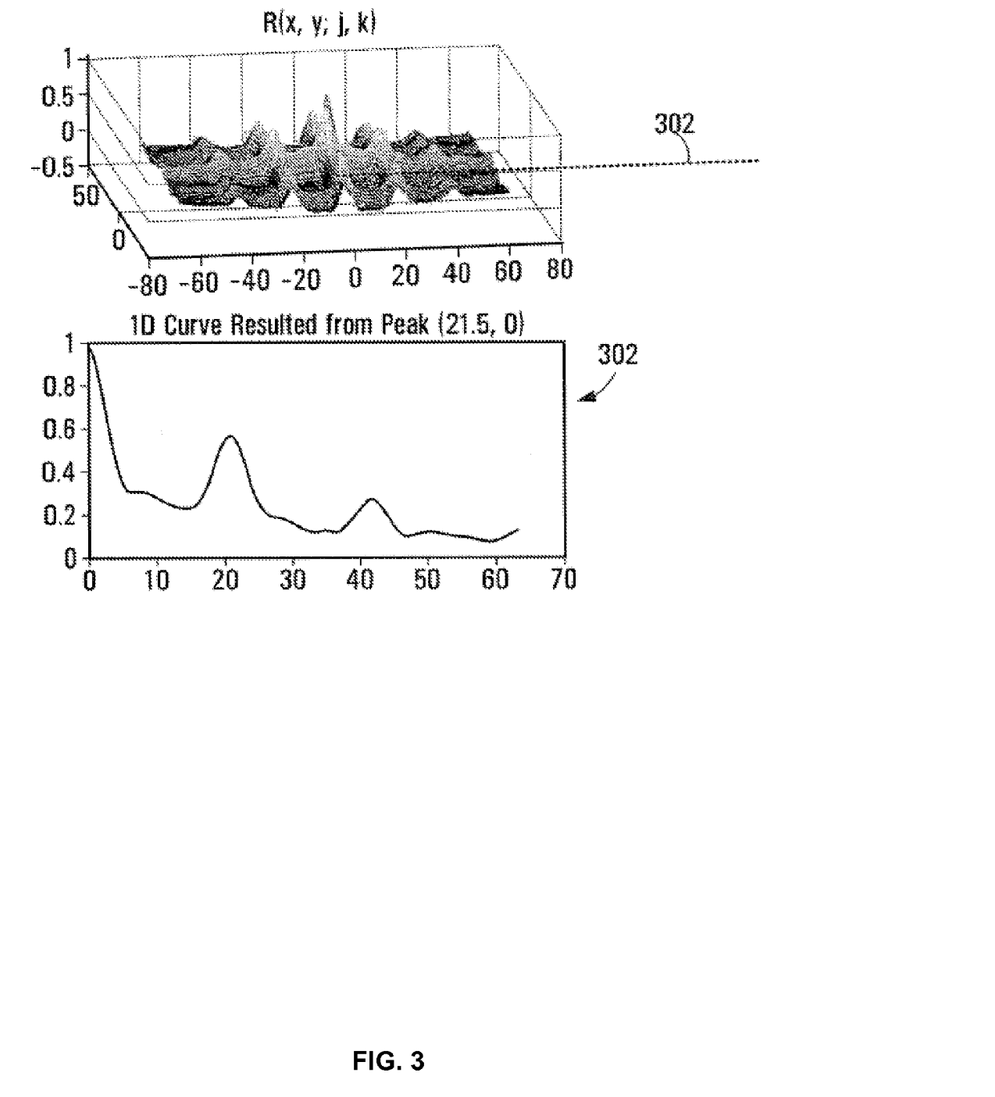
FIG. 3 shows an example auto-correlation function computed for a given pixel collection in a given image.

The identification of periodicity vectors occurring within original output image $108^*_j$ can be done in a variety of ways. Reference is now made to FIG. 3. In a non-limiting example, a two-dimensional autocorrelation function may be performed as the basis for the search. Specifically, the autocorrelation function for pixel collection $B_k$ in original output picture $108^*_j$ is denoted R(x, y; j, k) and can be computed as a scalar product of pixel collection $B_k$ with a version of itself that has been spatially shifted by an amount "x" along one of two Cartesian axes and by an amount "y" along the other. Of course, appropriate windowing may be used to reduce ringing and other discrete-time processing artifacts. The autocorrelation function R(x, y; j, k) will be a two-dimensional function having its global maximum at the origin (x=0, y=0) since pixel collection $B_k$ is multiplied with itself. Additionally, the autocorrelation function R(x, y; j, k) may have other noticeable—albeit less significant—peaks at other (x, y) values when multiple sub-regions of the shifted version of pixel collection $B_k$ contain substantially similar texture.

The more peaks there are along a definable trend line 302 (horizontal, vertical or diagonal) of the autocorrelation function R(x, y; j, k), the more indicative this is of a repetitive pattern. By taking the one-dimensional Fourier transform of the autocorrelation function R(x, y; j, k) along that trend line 302, one obtains the spatial frequency at which the repetitive pattern occurs. The inverse of the spatial frequency is then the period which, coupled with the orientation of the trend line 302, yields a periodicity vector having a respective magnitude and a respective direction. By performing this computation along multiple trend lines exhibiting a number of peaks, one obtains a set of periodicity vectors $\{P\}_{j,k}$ associated with pixel collection $B_k$ in original output picture 108* $_j$.

Depending on the number of periodicity vectors in each set $\{P\}_{j,k}$, as well as their respective magnitudes, adjustments can be made to the interpolation process described above. Specifically, at least three non-limiting possibilities are envisaged:

In a first non-limiting embodiment, the image processing engine 100 determines that there is a substantial repetitive pattern presence within pixel collection $B_k$ in original output picture 108* $_j$. This can be determined based on the periodicity vectors in the set $\{P\}_{j,k}$. For example, if the number of periodicity vectors in the set $\{P\}_{j,k}$ exceeds a certain threshold and/or if the set $\{P\}_{j,k}$ includes a periodicity vector whose magnitude exceeds a certain other threshold, this may be deemed a substantial repetitive pattern presence within pixel collection $B_k$. Accordingly, the image processing engine 100 causes copies of pixel collection $B_k$ to appear in one or more (possibly all) of the R interpolated pictures $\{110\}_j$ without any translation thereof. Basically, this overrides the effect of having selected a "true" motion vector $V^*_k$ for pixel collection Bk in original output image 108* $_j$. Alternatively, instead of causing copies of pixel collection $B_k$ to appear in one or more (possibly all) of the R interpolated pictures $\{110\}_j$ without any translation thereof, it is within the scope of the present invention to use other techniques such as alpha-blending.

Meanwhile, other pixel collections in original output picture 108* $_j$ that are not deemed to be affected by a substantial presence of repetitive patterns may continue to be translated, as before, by a scaled version of the true motion vector for that pixel collection in original output picture 108* $_j$.

The above technique can be referred to as partial fallback, and will tend to cause interpolation-induced artifacts, if any, to be less perceptible in the output picture stream 106.

Figure 4:
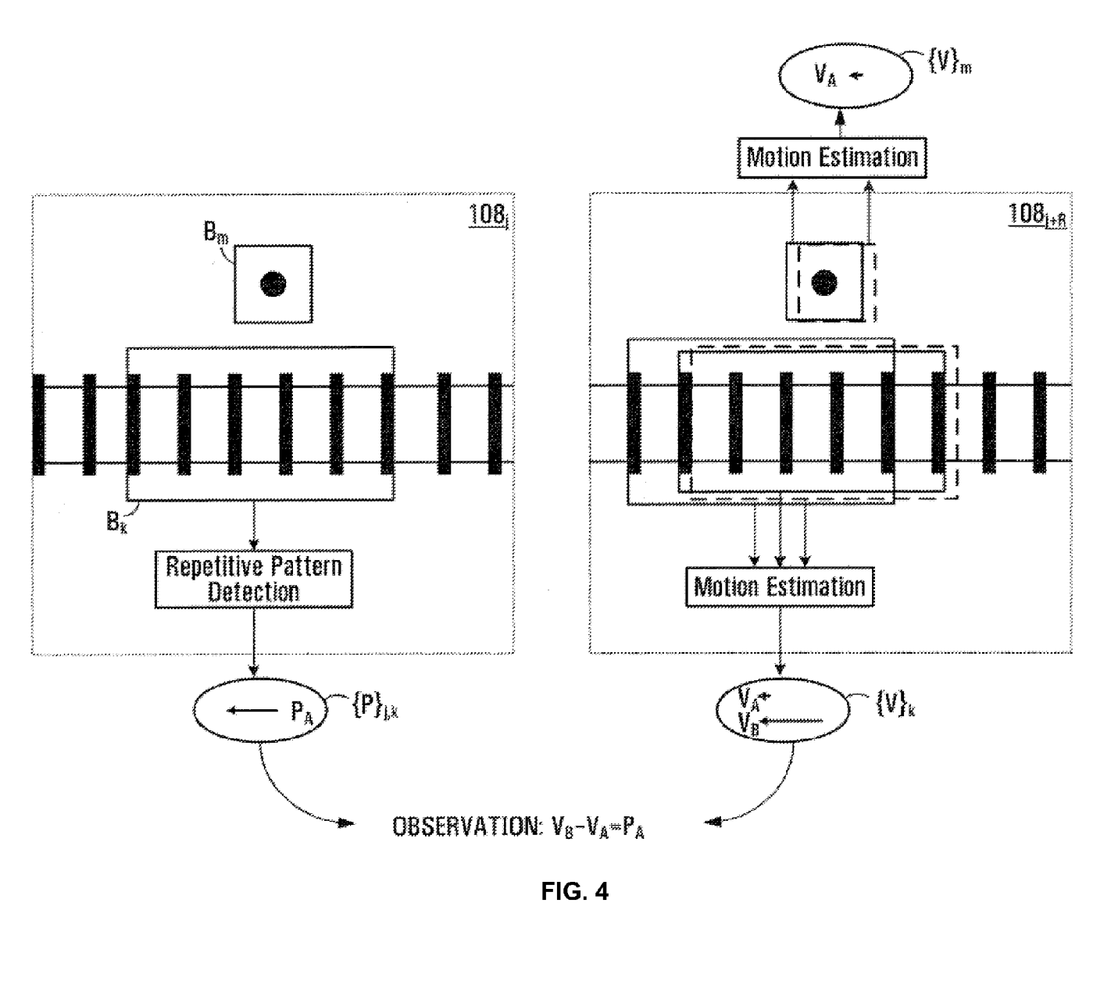
FIG. 4 illustrates a scenario where the difference between a pair of candidate motion vectors for a particular pixel collection of a particular output image corresponds to a periodicity vector for that pixel collection.

In a second non-limiting embodiment, the image processing engine 100 considers pixel collection $B_k$ in original output picture 108* $_j$. With reference to FIG. 4, consider the case where there are multiple candidate motion vectors in the set of candidate motion vectors $\{V\}_k$ for pixel collection $B_k$ including, say, $V_A$ and $V_B$, among others. This can imply that there is an ambiguity as to whether the true motion of pixel collection $B_k$ is correctly expressed by $V_A$ or by $V_B$, or by another candidate motion vector in the set $\{V\}_k$.

Now assume that pairs of candidate motion vectors within the set $\{V\}_k$ are compared to one another, and that the difference between $V_A$ and $V_B$ is observed to be the same as (or substantially similar to) one of the periodicity vectors in the set $\{P\}_{k,j}$. For example, from FIG. 4, it is observed that $V_B - V_A = P_A$. This observation can lead to the conclusion that either or both of $V_A$ and $V_B$ may be attributable to the presence of repetitive patterns present within the given pixel collection $B_k$, in particular the repetitive pattern associated with periodicity vector $P_A$. In other words, when two candidate motion vectors differ by an amount that corresponds to a periodicity vector, then it reduces the likelihood that one or both of the candidate motion vectors is a true motion vector. As a result, it is within the scope of this embodiment to disqualify (remove from consideration) either or both of $V_A$ and $V_B$ as candidate motion vectors for the given pixel collection $B_k$.

To assist in determining whether either or both of $V_A$ and $V_B$ should be removed from consideration, various techniques could be used. For example, reference can be made to other nearby pixel collections such as, say, $B_m$. For example, as shown in FIG. 4, let it be the case that $V_A$ is also a candidate motion vector in the set $\{V\}_m$ and is not subject to prospective disqualification (which would otherwise arise if the difference between it and another candidate motion vector in the set $\{V\}_m$ were to correspond to a periodicity vector in the set $\{P\}_{m,j}$). In such a case, then it may be appropriate to remove VB from the set $\{V\}k$ and to continue to consider $V_A$ as a candidate motion vector in the set $\{V\}_k$ (as well as the set $\{V\}_m$).

In a third non-limiting embodiment, the image processing engine 100 determines that there is a substantial repetitive pattern presence in several pixel collections within original output picture 108* $_j$. This can be determined based on the periodicity vectors in the set $\{P\}_{j,k}$ for multiple values of k. For example, if the number of periodicity vectors in the sets $\{P\}_{j,k1}$, $\{P\}_{j,k1}$, etc. exceeds a certain threshold and/or if the sets $\{P\}_{j,k1}$, $\{P\}_{j,k1}$, etc. includes several periodicity vectors whose magnitude exceeds a certain other threshold, this may be deemed a substantial repetitive pattern presence within original output picture 108* $_j$ Alternatively, the frame rate conversion entity 200 may deem there to be a substantial repetitive pattern presence within original output picture 108* $_j$ by performing an analysis of the autocorrelation function R(x, y; j, k) over a range of values for the variable k (i.e., over multiple pixel collections). Specifically, a large number of peaks and/or the presence of one or more high-magnitude peaks may be deemed a substantial repetitive pattern presence within original output picture 108* $_j$.

In either case, under this third non-limiting embodiment, the image processing engine 100 causes copies of original output image 108* $_j$ to appear as one or more (possibly all) of the R interpolated pictures $\{110\}_j$ without any translation of any of its pixel collections $B_{1,2,3,...}$. Basically, this overrides the effect of having selected the "true" motion vectors $V^*_{1,2,3,...}$ for pixel collections $B_{1,2,3,...}$ in original output image 108* $_j$. Alternatively, instead of causing copies of original output image 108* $_j$ to appear in one or more (possibly all) of the R interpolated pictures $\{110\}_j$, it is within the scope of the present invention to use other techniques such as alpha-blending.

The above technique can be referred to as global fallback, and will, similarly to the other techniques described above, tend to cause interpolation-induced artifacts, if any, to be less perceptible in the output picture stream 106.

Those skilled in the art should also appreciate that not all of the steps described above are essential in all embodiments. Moreover, the order of certain steps can be interchanged without affecting the end result. Those skilled in the art should appreciate that the image processing engine 100 can be implemented in an application-specific integrated circuit (ASIC) such as can be integrated into a television set, computer graphics processor or other electronic device. Alternatively, the image processing engine 100 can be implemented by programmable elements of a computing device such as a personal computer, mobile computer or mobile communication device. Other implementations will be apparent to those of skill in the art as being within the scope of the present invention.

It should also be appreciated that in some embodiments, all or part of the image processing engine 100 can be manufactured based on a low-level hardware description obtained using a logic synthesis tool that is run on a computing device. The logic synthesis tool reads source code containing a functional description of the image processing engine 100 (e.g., in a language such as HDL, VHDL, Verilog) and outputs a definition of the physical implementation of a circuit suitable for implementing corresponding functionality.

While specific embodiments of the present invention have been described and illustrated, it will be apparent to those skilled in the art that numerous modifications and variations can be made without departing from the scope of the invention as defined in the appended claims.

What is claimed is:

1. A system comprising:
   an input configured to receive a sequence of input pictures at a first frame rate; and
   a frame rate conversion entity configured to generate a sequence of output pictures at a second frame rate from the sequence of input pictures, wherein the output pictures comprise a sequence of original output pictures and interpolated pictures,
   wherein to generate a first interpolated picture from a first original input picture, the frame rate conversion entity attempts to detect a presence of repetitive patterns in the first original input picture;
   wherein responsive to detecting the presence of repetitive patterns within a pixel collection in the first original input picture, the frame rate conversion entity generates the first interpolated picture by copying the pixel collection from the first original input picture to positions in the first interpolated picture without any translation; and
   wherein responsive to failing to detect the presence of repetitive patterns in the first original input picture, the frame rate conversion entity generates the first interpolated picture by translating collections of pixels from the first original input picture by a scaled motion vector corresponding to a relative temporal position of the first interpolated picture from one of the original output pictures to a subsequent one of the original output pictures.

2. The system of claim 1, wherein to carry out repetitive pattern presence detection within the first original input picture, the frame rate conversion entity is configured to identify sets of zero or more periodicity vectors within corresponding pixel collections in the first original input picture.

3. The system of claim 2, wherein to identify a set of periodicity vectors within a given pixel collection in the first original input picture, the frame rate conversion entity is configured to:
   perform an autocorrelation function on the given pixel collection to identify peaks along one or more trend lines;
   for each trend line, formulate a respective periodicity vector for the given pixel collection by determining a period of the peaks along the trend line and a direction of the trend line.

4. The system of claim 3, wherein determining the period of the peaks along the trend line comprises effecting a 1-D Fourier transform along the trend line.

5. The system of claim 2, wherein to generate the motion vector for a given pixel collection, the frame rate conversion entity is further configured to generate a true motion vector for the given pixel collection in the first original input picture based on a set of periodicity vectors within the given pixel collection.

6. The system of claim 2, wherein the frame rate conversion entity is further configured to assess substantial repetitive pattern presence detection within a given pixel collection in the first original input picture when a set of periodicity vectors corresponding to the given pixel collection in the first original input picture includes a periodicity vector having a magnitude above a given threshold.

7. The system of claim 2, wherein to generate a motion vector for a given pixel collection based on a set of periodicity vectors within the given pixel collection, the frame rate conversion entity is configured to generate a set of candidate motion vectors for the given pixel collection; compare differences between pairs of candidate motion vectors to individual ones of the periodicity vectors within the given pixel collection; select a true motion vector from among the candidate motion vectors excluding at least one candidate motion vector for which the difference between it and another candidate motion vector was found to correspond substantially to one of the periodicity vectors.

8. The system of claim 2, wherein the frame rate conversion entity is configured to assess non-substantial repetitive pattern presence detection within a given pixel collection in the first original input picture when a set of periodicity vectors corresponding to the given pixel collection in the first original input picture does not include any periodicity vector having a magnitude above a given threshold.

9. The system of claim 1, wherein responsive to detecting the presence of repetitive patterns within a second pixel collection in the first original input picture, the first interpolated picture is further generated by blending the second pixel collection from the first original input picture to positions in the first interpolated picture without any translation.

10. A method comprising:
    receiving a sequence of input pictures at a first frame rate, the input pictures including a first original input picture;
    checking for a presence of repetitive patterns in the first original input picture;
    responsive to detecting the presence of repetitive patterns within a pixel collection in the first original input picture, generating a first interpolated picture by copying the pixel collection from the first original input picture to positions in the first interpolated picture without any translation;
    responsive to failing to detect the presence of repetitive patterns in the first original input picture, generating the first interpolated picture by translating collections of pixels from the first original input picture by a scaled motion vector corresponding to a relative temporal position of the first interpolated picture from one of a plurality of original output pictures to a subsequent one of the original output pictures; and
    outputting a sequence of output pictures at a second frame rate from the sequence of input pictures, wherein the output pictures comprise a combination of original output pictures and interpolated pictures, the interpolated pictures including the first interpolated picture.

11. The method of claim 10, wherein to carry out repetitive pattern presence detection within the first original input picture, sets of zero or more periodicity vectors are identified within corresponding pixel collections in the first original input picture.

12. The method of claim 11, wherein to identify a set of periodicity vectors within a given pixel collection in the first original input picture, an autocorrelation function is performed on the given pixel collection to identify peaks along one or more trend lines and for each trend line, wherein a respective periodicity vector for the given pixel collection is formulated by determining a period of the peaks along the trend line and a direction of the trend line.

13. The method claim 12, wherein determining the period of the peaks along the trend line comprises effecting a 1-D Fourier transform along the trend line.

14. The method of claim 11, wherein repetitive pattern presence detection is positively determined within a given pixel collection in the first original input picture when a set of periodicity vectors corresponding to the given pixel collection in the first original input picture includes a periodicity vector having a magnitude above a given threshold.

15. The method of claim 11, wherein to a non-substantial repetitive pattern presence detection is assessed within a given pixel collection in the first original input picture when a set of periodicity vectors corresponding to the given pixel collection in the first original input picture does not include any periodicity vector having a magnitude above a given threshold.

16. The method of claim 11, wherein to generate a motion vector for a given pixel collection based on a set of periodicity vectors within the given pixel collection, a set of candidate motion vectors for the given pixel collection are generated; differences between pairs of candidate motion vectors are compared to individual ones of the periodicity vectors within the given pixel collection; a true motion vector is selected from among the candidate motion vectors excluding at least one candidate motion vector for which the difference between it and another candidate motion vector was found to correspond substantially to one of the periodicity vectors.

17. The method of claim 10, wherein responsive to detecting the presence of repetitive patterns within a second pixel collection in the first original input picture, the first interpolated picture is further generated by blending the second pixel collection from the first original input picture to positions in the first interpolated picture without any translation.

18. A non-transitory computer-readable storage medium comprising computer-readable instructions for instructing a computing device, the instructions comprising:
    code that receives a sequence of input pictures at a first frame rate, the input pictures including a first original input picture;
    code that checks for a presence of repetitive patterns in the first original input picture;
    code that, responsive to detecting the presence of repetitive patterns within a pixel collection in the first original input picture, generates a first interpolated picture by copying the pixel collection from the first original input picture to positions in the first interpolated picture without any translation;
    code that, responsive to failing to detect the presence of repetitive patterns in the first original input picture, generates the first interpolated picture by translating collections of pixels from the first original input picture by a scaled motion vector corresponding to a relative temporal position of the first interpolated picture from one of a plurality of original output pictures to a subsequent one of the original output pictures; and
    code that outputs a sequence of output pictures at a second frame rate from the sequence of input pictures, wherein the output pictures comprise a combination of original output pictures and interpolated pictures, the interpolated pictures including the first interpolated picture.

19. The non-transitory computer-readable storage medium of claim 18, wherein to carry out repetitive pattern presence detection within the first original input picture, sets of zero or more periodicity vectors are identified within corresponding pixel collections in the first original input picture.

20. The non-transitory computer-readable storage medium of claim 18, wherein responsive to detecting the presence of repetitive patterns within a second pixel collection in the first original input picture, the first interpolated picture is further generated by blending the second pixel collection from the first original input picture to positions in the first interpolated picture without any translation.

* * * * *